United States Patent [19]

Wagner et al.

[11] 4,209,204
[45] Jun. 24, 1980

[54] TWO-PIECE SEAL FOR TRACK CHAIN JOINTS

[75] Inventors: Joseph F. Wagner; Richard E. Murray, both of Dubuque, Iowa

[73] Assignee: Deere & Company, Moline, Ill.

[21] Appl. No.: 931,942

[22] Filed: Aug. 8, 1978

[51] Int. Cl.² ............................................. F16J 15/38
[52] U.S. Cl. ....................................... 305/11; 277/92; 277/95
[58] Field of Search ................... 305/11; 277/92, 95, 277/96, 83

[56] References Cited

U.S. PATENT DOCUMENTS

| | | | |
|---|---|---|---|
| 2,699,974 | 1/1955 | Deffenbaugh | 305/11 |
| 4,089,531 | 5/1978 | Roley et al. | 305/11 X |
| 4,094,516 | 6/1978 | Morley et al. | 305/11 X |
| 4,126,359 | 11/1978 | Holze | 305/11 |

Primary Examiner—David A. Scherbel

[57] ABSTRACT

A sealed joint assembly interconnecting links of crawler tractor track chain includes an annular sealing member made of relatively rigid abrasion resistant material formed to define contiguous axially and radially extending bands, the sealing member thus being generally right angular in cross section. The radially extending band includes a pair of surfaces which converge axially to form an annular edge which engages an end surface of a track bushing and is in fact biased theretowards by means of an annular compressive load member made of resilient relatively pliant material of generally rectangular cross section loaded predominantly in compression between the bottom of a counterbore of one of the links and the sealing member. A spacer ring is located radially inwardly of the axially extending band of the sealing member and augments the band in restraining radially inward expansion of the load member.

7 Claims, 2 Drawing Figures

TWO-PIECE SEAL FOR TRACK CHAIN JOINTS

BACKGROUND OF THE INVENTION

This invention relates to seals and more particularly relates to two-piece seals for use in sealing track link joints of crawler tractor track chains, with one piece of the seals being a sealing member made of relatively rigid abrasion resistant material and with the other piece of the seals being a load member made of a resilient relatively pliant material compressed against the sealing member to effect and/or maintain the sealing function of the latter.

U.S. Pat. No. 3,841,718 granted to Reinsma on Oct. 15, 1974 discloses a two-piece seal of the general type to which the invention pertains. However, the sealing member of the seal is not of a cross section having sufficient rigidity to prevent radial and circumfential buckling of the sealing surface of the sealing member during rotation thereof under load.

SUMMARY OF THE INVENTION

According to the present invention there is provided a novel two-piece seal of the type comprising a sealing member of relatively rigid abrasive resistant material and a load member of relatively pliant resilient material.

An object of the invention is to provide a two-piece seal of the aforementioned type which is of a relatively simple configuration that operates to effectively seal an articulated joint over a wide range of working conditions.

A more specific object is to provide a seal wherein the sealing and load members are respectively substantially L-shaped and rectangular shaped in cross-section and wherein the seal is installed in axial compression between opposite axially facing relatively oscillatable surfaces of members making up the joint and the resultant of the force exerted by the load member on the sealing member passes substantially axially through a sealing edge of the sealing member.

Yet another object is to provide a seal as described in the immediately preceding object wherein the load member transmits the driving torque of one of the oscillatable surfaces to the sealing member.

Another object is to provide a sealing member having an axially extending band and to mount a spacer in close proximity to the band such as to restrain radially inward movement of the sealing member.

These and other objects will become apparent from a reading of the following description together with the appended drawing.

DESCRIPTION OF THE PREFERRED EMBODIMENT

Figure 1:
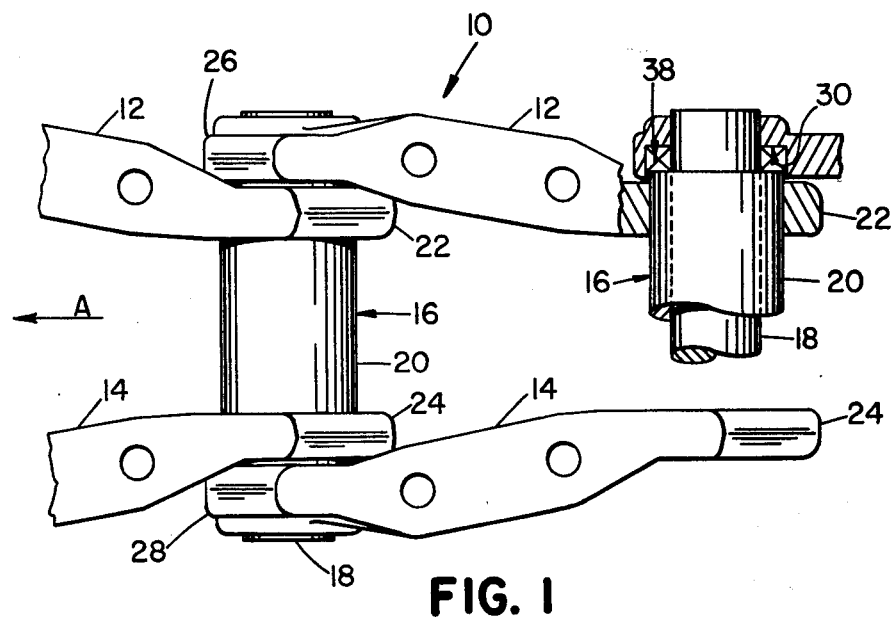
FIG. 1 is a top plan view with portions broken away, of a track chain section showing a typical joint with which seals constructed according to the present invention are particularly adapted to be used.

Referring to the drawings, there is shown a track chain section 10 including, as viewed facing in the direction of arrow A in FIG. 1, sets of right and left links 12 and 14 pivotally connected to similar sets of links at joint assemblies 16. Specifically each joint assembly 16 includes a central pin 18 having a bushing 20 rotatably received thereon. Respectively pressed onto opposite ends of the bushing 20 are bushing receiving ends 22 and 24 respectively of one of the sets of the right and left links 12 and 14. The opposite ends of the pin 18 extend beyond the bushing 20 and respectively pressed thereon are pin receiving ends 26 and 28 of another of the sets of links 12 and 14. The pin receiving ends of the links 12 and 14 are each provided with a counter bore 30 surrounding the pin 18 and having a bottom surface 32 facing axially toward an axially facing end surface 34 of the bushing 20 and having an axially extending, radially inwardly facing surface 36 contiguous with the bottom surface 32. The counter bore 30 cooperates with the end surface 34 of the bushing 20 to define an annular seal cavity in which a seal 38 is received for preventing foreign matter from entering or lubricant from leaving a clearance space 40 between the pin 18 and bushing 20 via a route defined by a clearance space 42 existing between adjacent left and right ends of the links 12 and 14. The axial dimension of the seal cavity is kept at a predetermined minimum by means of a spacer ring 44 received on the pin 18 and having opposite ends disposed for engagement by the bushing end surface 34 and counterbore bottom surface 32.

Figure 2:
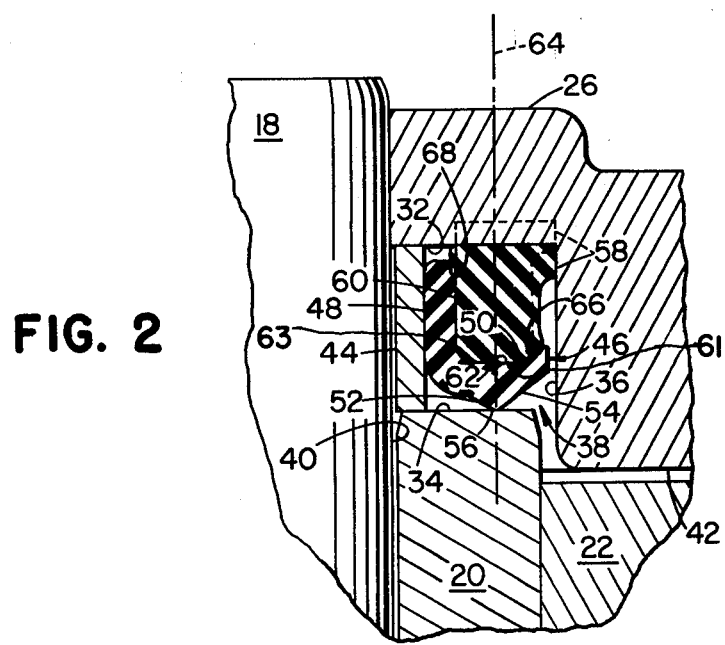
FIG. 2 is a longitudinal sectional view showing a seal constructed according to the present invention installed in a joint of the type illustrated in FIG. 1.

Referring now to FIG. 2, it can be seen that the seal 38 includes an annular sealing member 46 installed in the seal cavity and formed to include an axially extending band or leg 48 received on the spacer ring 44 and a radially extending band or leg 50 disposed adjacent the bushing end surface 34 with the bands 48 and 50 being joined such that the member 46 in substantially right angular or L-shaped in cross-section. The band 50 has radially inner and outer surfaces 52 and 54, respectively, converging axially toward the surface 34 and meeting at an edge 56 maintained in sealing engagement with the surface 34 in a manner to be presently described. The sealing member 46 is preferably made of a relatively rigid abrasion resistant material such as polyurethane, for example.

The edge 56 of the sealing member 46 is maintained in sealing engagement with the bushing end surface 34 by means of an annular compressive load member 58 which is predominantly rectangular in cross section and has contiguous axially and radially extending surfaces 60 and 61 respectively disposed in embracing relationship to contiguous axially and radially extending surfaces 62 and 63 of the bands 48 and 50 of the sealing member 46. During installation, the load member 58 is compressed axially between the link surface 32 and the sealing member 46 from an uncompressed free state, as shown in dashed lines, to a compressed state, as shown in solid lines. The relationship between the load member 58 and sealing member 46 is such that the surface 61 of the load member 58 is engaged in its entirety with the surface 63 of the sealing member 46 and such that both the mating surfaces 61 and 63 and the load member itself are located so as to be approximately half radially inwardly and half radially outwardly, relative to the pin 18, from the annular contacting surface 56 of the seal member. Thus, the resultant of the force exerted by the load member on the sealing member passes approximately centrally through the edge 56 of the sealing member along a line 64 extending parallel to the axis of the pin 18. A lip 66 at the end of the band 50 of the sealing member 46 aids in holding the load member 58 in place and establishes an increased area of contact pressure which aids in excluding foreign material from working in between the load and sealing members. A sharp outer edge 68 of the band 48 serves a purpose similar to lip 66. It is here noted that the load member 58 is preferably made of a resilient, relatively pliant material such as rubber or the like.

Thus, it will be appreciated that because of the narrow area of contact between the edge 56 of the sealing member 46 and the bushing end surface 34, the compressive force of the load member 58 will be concentrated so as to effectively prevent foreign matter from entering or lubricant from leaving the clearance space 40 between the pin 18 and bushing 20 via a route crossing the edge 56. Further, it will be appreciated that the load member 58 acts as a seal over a relatively large area to prevent foreign matter from entering or lubricant from leaving the space 40 via a route along the inner face of the load member 58 with the surfaces 32 and 36 of the link counterbore 30.

Also, because the resultant of the force exerted by the load member 58 on the sealing member 46 is at least approximately parallel to the axis of the pin 18, there will be no torsional load tending to twist or deflect the sealing member 46 out of position and accordingly very little radial shifting of the area of contact between the edge 56 and the bushing end surface 34 occurs. This result is augmented by the fact that the right angle cross section of the sealing member 46 resists torsional deflection and the spacer ring 44 prevents radially inward movement of the sealing member 46.

It will also be appreciated that because the load member 58 has a large area of contact with the counter bore surfaces 32 and 36 and with the bands 60 and 50 of the sealing member 46, its interface with these surfaces will remain static during relative pivoting movement between the bushing 20 and the counter bore surfaces, thus resulting in relative movement between the edge 56 of the sealing member 46 and the bushing end surface 34.

We claim:

1. In a joint construction pivotally joining trailing and leading ends of track links of a tractor track chain including a pin having the trailing ends of a first pair of links respectively press fit on opposite ends thereof, a bushing rotatably received on the pin between the first pair of links and having the leading ends of a second pair of links press fit on opposite ends thereof, the trailing ends of the first pair of links respectively cooperating with the opposite ends of the bushing to define a pair of annular seal cavities and a pair of identical annular seal structures being respectively located in the annular seal cavities for excluding foreign matter from the interface of the pin and bushing, the improvement residing in the seal structures which each comprise:
    an annular sealing member made of a relatively rigid abrasion resistant material formed to be generally right angular in cross section;
    said sealing member as viewed in cross section, having first and second legs respectively disposed in general parallelism with the pin and a flat end surface of the bushing extending at a right angle to the pin; said second leg having an axially facing annular tapered contact surface forming the sole engagement of the sealing member with the flat end surface of the bushing and having a second surface facing axially opposite from the contact surface; an annular compressive load member being predominately rectangular in crosssection and being made of a resilient material which is softer than the material of the sealing member;
    said load member having a first axially facing surface mated along its entire length with the second surface of the sealing member;
    and the first axially facing surface together with the remainder of the load member being located approximately half radially inwardly toward the pin from the contact surface and half radially outwardly from the pin from the contact surface and compressed axially between the first pair of links and the legs of the sealing member so as to exert a force having a resultant acting long a line of action passing approximately through the contact surface and in general parallelism to the pin.

2. The joint construction defined in claim 1 wherein a spacer is located on the pin in each of the seal cavities just radially inwardly of the associated sealing member.

3. The joint construction defined in claim 1 wherein the second leg of the sealing member includes a radially outer end forming an axially extending lip disposed in tight engagement with a radially outer surface portion of the load member.

4. In a sealed joint assembly including first and second axially spaced members mounted for relative rotation about a common axis and having respective surfaces cooperating with each other to define an annular seal cavity having opposite first and second axially facing surface portions respectively defined by the first and second axially spaced members and an annular seal received in the cavity and compressively loaded between the first and second axially facing surface portions, the improvement residing in the seal and comprising:
    an annular sealing member made of a relatively rigid, abrasion resistant material formed to define contiguous axially and radially extending bands, respectively extending axially between the first and second surface portions and in general parallelism to the first surface portion; said radially extending band including a pair of surfaces converging axially to an edge which engages the first surface portion and forms the sole contact between the seal and the first member and thus defines a relatively narrow sealing area;
    an annular compressive load member made of a resilient material which is softer than the material of the sealing member and is predominantly rectangular in cross section and has contiguous axially and radially extending surfaces respectively in engagement with the axially and radially extending bands of the sealing member with the entire length of the radially extending surface of the load member being engaged with the radially extending surface of the sealing member; and
    the radially extending surface of said load member together with the remainder of said load member being located approximately half radially inwardly and half radially outwardly of the edge and being compressed between the second surface portion and the radially extending band of the sealing member such as to exert a compressive force having an axial resultant that passes at least approximately through the edge of the sealing member.

5. The sealed joint assembly defined in claim 4 wherein the seal cavity includes an annular radially inwardly facing surface portion joined to the second surface portion and said load member being in confined engagement with the radially inwardly facing surface portion.

6. The sealed joint assembly defined in claim 4 wherein an annular spacer ring extends axially between the first and second surface portions at a location radially inwardly of and adjacent to the axially extending band of the seal member whereby the action of the radially extending band in constraining radially inwardly expansion of the load member is augmented.

7. The sealed joint assembly defined in claim 4 wherein the radially extending band of the sealing member includes a radially outer end forming an axially extending lip disposed in tight engagement with a radially outer surface portion of the load member.

* * * * *